United States Patent
Pearman et al.

(10) Patent No.: US 12,186,837 B2
(45) Date of Patent: Jan. 7, 2025

(54) FEMALE WELDING LEAD CONNECTOR COLLAR INCLUDING SAFETY FLIP COVER

(71) Applicant: Alpha/Omega Energy Solutions, LLC, Cumberland Gap, TN (US)

(72) Inventors: Bradley Lance Pearman, Cumberland Gap, TN (US); Kenny Lavelle Miller, Madeira Beach, FL (US)

(73) Assignee: Alpha/Omega Energy Solutions, LLC, Cumberland Gap, TN (US)

( * ) Notice: Subject to any disclaimer, the term of this patent is extended or adjusted under 35 U.S.C. 154(b) by 429 days.

(21) Appl. No.: 17/527,499

(22) Filed: Nov. 16, 2021

(65) Prior Publication Data

US 2022/0281042 A1 Sep. 8, 2022

Related U.S. Application Data (63) Continuation-in-part of application No. 17/190,636, filed on Mar. 3, 2021, now Pat. No. 11,177,584.

(51) Int. Cl.
*B23K 37/00* (2006.01)
*H01R 13/447* (2006.01)

(52) U.S. Cl.
CPC ......... *B23K 37/006* (2013.01); *H01R 13/447* (2013.01)

(58) Field of Classification Search
CPC ........ B23K 37/006; B23K 37/00; B23K 9/32; H01R 13/44; H01R 13/447; H01R 9/11
USPC ...................................................... 174/138 F
See application file for complete search history.

(56) References Cited

U.S. PATENT DOCUMENTS

| | | | |
|---|---|---|---|
| 122,396 A | 1/1872 | McIlhenny |
| 142,388 A | 9/1873 | Goble |
| 2,518,289 A | 4/1950 | Cox |
| 2,873,357 A | 2/1959 | Landis |
| 2,980,790 A | 4/1961 | Bracken |
| 3,226,667 A | 12/1965 | Senior |
| 4,300,373 A | 11/1981 | Camos |
| 4,381,063 A | 4/1983 | Leong |
| 4,458,923 A | 7/1984 | Burroughs |
| 4,541,256 A | 9/1985 | Green |
| 4,643,505 A | 2/1987 | House |
| 4,702,539 A | 10/1987 | Cusick |
| 4,826,215 A | 5/1989 | Sullivan |
| 4,909,756 A | 3/1990 | Jervis |
| 5,015,013 A | 5/1991 | Nadin |

(Continued)

FOREIGN PATENT DOCUMENTS

| | | |
|---|---|---|
| CA | 552341 | 1/1958 |
| CA | 2485302 | 6/2005 |

(Continued)

OTHER PUBLICATIONS

Cable Collar Kit_by Extron Products_pp. 1-4_ Nov. 2018.*

(Continued)

*Primary Examiner* — Timothy J Thompson
*Assistant Examiner* — Guillermo J Egoavil
(74) *Attorney, Agent, or Firm* — Robinson IP Law, PLLC (57) ABSTRACT

A universal female welding lead connector collar including a safety cover hingedly connected to a main body of the collar. When engaged on the outer surface of a female welding lead connector, the safety cover can be kept closed to shield a female welding lead receptacle inside the female welding lead connector to prevent electrical arcing or electrocution.

6 Claims, 9 Drawing Sheets

(56) References Cited

U.S. PATENT DOCUMENTS

| | | | |
|---|---|---|---|
| 5,052,939 A | 10/1991 | Koch | |
| 5,061,194 A | 10/1991 | Herman et al. | |
| 5,129,839 A | 7/1992 | Vanskiver | |
| 5,139,429 A | 8/1992 | Herman et al. | |
| 5,193,366 A | 3/1993 | Brinkman | |
| 5,217,387 A | 6/1993 | Hull et al. | |
| 5,347,084 A | 9/1994 | Roney | |
| 5,379,836 A | 1/1995 | Jordan | |
| 5,506,922 A | 4/1996 | Grois et al. | |
| 5,525,073 A | 6/1996 | Sampson | |
| 5,685,730 A | 11/1997 | Cameron | |
| 5,821,462 A | 10/1998 | Raleigh | |
| 5,844,171 A | 12/1998 | Fitzgerald | |
| 6,074,238 A | 6/2000 | DeRoss | |
| 6,099,340 A | 8/2000 | Florentine | |
| 6,149,445 A | 11/2000 | Daddono | |
| 6,171,132 B1 | 1/2001 | Schmidt | |
| 6,184,492 B1 | 2/2001 | Busopulos | |
| 6,250,946 B1 | 6/2001 | Tardy | |
| 6,280,235 B1 | 8/2001 | Radliff | |
| 6,848,926 B2 | 2/2005 | Ling | |
| 6,913,294 B2 | 7/2005 | Treverton | |
| 6,935,871 B2 | 8/2005 | Maurer | |
| 7,077,681 B2 | 7/2006 | Behoo | |
| 7,285,725 B1 | 10/2007 | Saman | |
| 7,384,297 B2 | 6/2008 | King, Jr. et al. | |
| 7,431,611 B2 | 10/2008 | King, Jr et al. | |
| 7,550,672 B2 | 6/2009 | Chadbourne | |
| 7,628,428 B2 | 12/2009 | Rampton | |
| 7,722,086 B2 | 5/2010 | Ishiki | |
| 8,408,929 B2 | 4/2013 | Solon | |
| 8,870,587 B2 | 10/2014 | Nooner et al. | |
| 8,875,792 B2 | 11/2014 | Whitelaw | |
| 9,211,602 B1 | 12/2015 | Carney et al. | |
| 10,056,745 B2 | 8/2018 | Nooner et al. | |
| 10,431,930 B1 | 10/2019 | Pearman | |
| 10,670,175 B2* | 6/2020 | Klein | F16L 37/0985 |
| 10,720,731 B2 | 7/2020 | Pearman | |
| 10,746,329 B2 | 8/2020 | Pearman | |
| 10,749,296 B2 | 8/2020 | Pearman | |
| 10,870,163 B1 | 12/2020 | Pearman | |
| 11,177,584 B1 | 11/2021 | Pearman | |
| 2002/0092837 A1 | 7/2002 | Keats | |
| 2004/0097120 A1 | 5/2004 | Limber et al. | |
| 2004/0123997 A1 | 7/2004 | Drane et al. | |
| 2004/0144758 A1 | 7/2004 | Onishi | |
| 2005/0136716 A1 | 6/2005 | Behoo | |
| 2007/0037430 A1 | 2/2007 | Evans | |
| 2007/0072461 A1 | 3/2007 | Williams et al. | |
| 2009/0088010 A1* | 4/2009 | Smith | H01R 13/5205 439/271 |
| 2012/0064744 A1 | 3/2012 | Messner | |
| 2013/0119041 A1 | 5/2013 | Humenik | |
| 2013/0212842 A1 | 8/2013 | Rigollet et al. | |
| 2014/0038439 A1 | 2/2014 | Lee | |
| 2015/0069114 A1 | 3/2015 | Sunger et al. | |
| 2015/0236486 A1 | 8/2015 | Dinh | |
| 2015/0325940 A1 | 11/2015 | Foseide | |
| 2015/0354730 A1 | 12/2015 | Plunkett | |
| 2016/0024818 A1 | 1/2016 | Allen | |
| 2017/0087658 A1 | 3/2017 | Townsend | |
| 2017/0110831 A1 | 4/2017 | Su | |
| 2018/0166871 A1 | 6/2018 | Nooner et al. | |
| 2018/0368536 A1 | 12/2018 | Newson | |
| 2020/0141524 A1 | 5/2020 | Pearman | |
| 2020/0144767 A1 | 5/2020 | Pearman | |
| 2020/0144768 A1 | 5/2020 | Pearman | |
| 2020/0198485 A1 | 6/2020 | Schwan | |

FOREIGN PATENT DOCUMENTS

| | | | |
|---|---|---|---|
| CN | 210102513 U | * 2/2020 | ............... B65D 6/02 |
| EP | 0918590 | 12/2002 | |
| EP | 3249756 | 11/2017 | |
| GB | 907905 | 10/1962 | |
| GB | 931500 | 7/1963 | |
| GB | 1327584 | 8/1973 | |
| WO | 9749519 | 12/1997 | |
| WO | 2015047552 | 4/2015 | |

OTHER PUBLICATIONS

Crouse-Hinds 195305 Catalog_1304 to 1609_ 2013.*
LENCO-05289-Catalog_pp. 1-24_Feb. 2008.*
USESI_43085 Catalog _Crouse Hinds_1224 to 1396_2010.*
International Preliminary Report on Patentability, International Application No. PCT/US2022/018424, Aug. 29, 2023.
PCT International Search Report for PCT App. No. PCT/US2021/027685 dated May 12, 2021.
Written Opinion of the International Searching Authority for PCT App. No. PCT/US2021/027685 dated May 12, 2021.
Spec Sheet for Eureka HD Series Pin and Sleeve Electrical Connector available at the URL https://www.elecdirect.com/media/specsheets/100-Amp-Pin-And-Sleeve-Connectors-Watertight.pdf.
Office Action dated Apr. 21, 2021, U.S. Appl. No. 17/190,636.
Office Action dated Jul. 8, 2021, U.S. Appl. No. 17/190,636.
Office Action dated Aug. 19, 2021, U.S. Appl. No. 17/190,636.
Office Action dated Oct. 2, 2019, U.S. Appl. No. 16/180,540.
Office Action dated Jan. 17, 2020, U.S. Appl. No. 16/561,854.
Office Action dated Jan. 17, 2020, U.S. Appl. No. 16/588,136.
PCT International Search Report for PCT App. No. PCT/US2019/059339 dated Jan. 21, 2020.
PCT International Search Report for PCT App. No. PCT/US2019/059341 dated Jan. 21, 2020.
PCT International Search Report for PCT App. No. PCT/US2022/018424 dated Jun. 29, 2022.
Written Opinion of the International Searching Authority for PCT App. No. PCT/US2022/018424 dated Jun. 29, 2022.
Search History for Written Opinion of the International Searching Authority for PCT App. No. PCT/US2022/018424 dated Jun. 29, 2022.

* cited by examiner

FEMALE WELDING LEAD CONNECTOR COLLAR INCLUDING SAFETY FLIP COVER

CROSS-REFERENCE(S) TO RELATED APPLICATION(S)

This application is a continuation-in-part of and claims priority to U.S. patent application Ser. No. 17/190,636 entitled "FEMALE WELDING LEAD CONNECTOR INCLUDING SAFETY FLIP COVER" filed on Mar. 3, 2021, the entirety of which is incorporated herein by reference.

FIELD

This disclosure relates to the field of welding. More particularly, this disclosure relates to a collar including a safety flip cover for use with female welding lead connectors.

BACKGROUND

Welding leads (or "welding cable") is an electrical conductor for transmitting a welding current used for welding materials together (e.g., for arc welding or resistance welding). Welding leads typically include small copper strands wrapped together inside a nonconductive outer layer. Such leads typically have enlarged ends in the form of cable connectors wherein one end is typically a male end and the other a female end with both male and female features being highly conductive.

Welding leads can be both dangerous and expensive. Some dangers include potential electrocution if the connection between a first welding lead cable connector connected to a second welding leads cable connector becomes loose and conductive material is exposed outside or otherwise being the nonconductive outer layer of the welding leads. Unconnected welding lead connectors that are open and exposed can be particularly dangerous if the welding lead is "live" with current flowing through the welding lead. Usually, female welding lead connectors are the welding lead connector that provides power for welding. Therefore, female welding lead connectors pose the most risk of electrocution or electrical arcing.

What is needed, therefore, is device and method to overcome the issues mentioned above related to common welding leads.

SUMMARY

The above and other needs are met by a safety collar for use with a female welding lead connector, the safety collar comprising a collar main body configured to slide onto and fit tightly on an outside surface of a female welding lead connector; and a cover hingedly connected to the collar main body wherein the cover is free to rotate either from a closed position to an open position, or from an open position to a closed position. When the collar is fully engaged onto a female welding lead connector, the cover is free to rotate either from a closed position in which the cover shields a female receptacle of the female welding lead connector to an open position in which a male welding lead connector can be received into the female receptacle, or from an open position in which a male welding lead connector can be received into the female receptacle to a closed position in which the cover shields the female receptacle.

The safety collar preferably includes a biasing apparatus to either bias the cover to the open position or bias the cover to the closed position. The biasing apparatus preferably comprises a torsion spring.

The safety collar preferably comprises a plurality of grooves on an inside surface of the collar main body wherein the grooves are configured to accommodate bulges on outside surfaces of multiple types of female welding lead connectors so that the safety collar will fit snugly and in place when attached to a female welding lead connector.

Additionally of alternatively, the safety collar preferably comprises a plurality of bulges on an inside surface of the collar main body wherein the bulges are configured to accommodate grooves on outside surfaces of multiple types of female welding lead connectors so that the safety collar will fit snugly and in place when attached to a female welding lead connector.

In another aspect, a kit is disclosed including a plurality of safety collars identical to substantially similar to the safety collar described above. The kit includes a first safety collar of a first color; a second safety collar of a second color; and a third safety collar of a third color.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

The figures are provided to illustrate concepts of the invention disclosure and are not intended to embody all potential embodiments of the invention. Therefore, the figures are not intended to limit the scope of the invention disclosure in any way, a function which is reserved for the appended claims.

DETAILED DESCRIPTION

FIGS. 1-9 show various views of an embodiment of a female welding lead connector collar 100. The female welding lead connector collar 100 includes a collar main body 102 and a cover 104 hingedly connected to the collar main body 102. The cover 104 is preferably round and preferably completely covers a first end 106A of the collar main body 102 when the cover 104 is in a closed position as shown, for example, in FIG. 5 and FIG. 7. The collar main body 102 extends from the first end 106A to a second end 106B. The hinge connection between the collar main body 102 and the cover 104 permits the cover 104 to rotate from the closed position to an open position (shown in FIGS. 1-4 and 6) or from the open position to the closed position. When the cover 104 is in the open position and engaged with a female welding lead connector 108, a male welding lead connector can be inserted into a female receptacle 110 of the female welding lead connector 108. When the cover 104 is in the closed position, the cover 104 shields the female receptacle 110, thereby diminishing the chance of an electrical arc or electrocution to a bystander.

The collar main body 102 is preferably made of nonconductive material (such as, for example, rubber or plastic). The cover 104 is also preferably made of nonconductive material (such as, for example, rubber or plastic).

Figure 1:
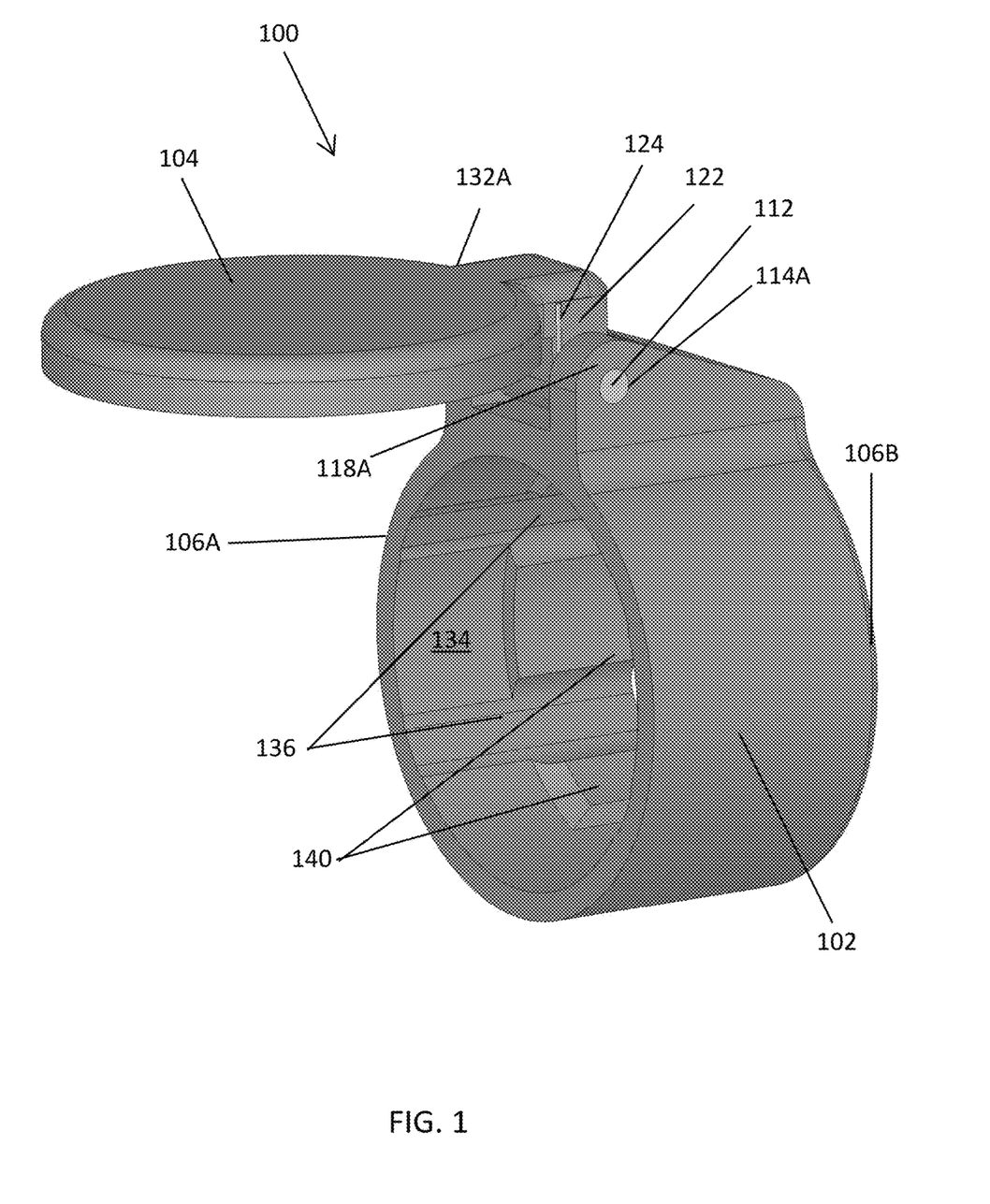
FIG. 1 shows a first perspective view of a female welding lead connector collar including a safety flip cover.
Figure 2:
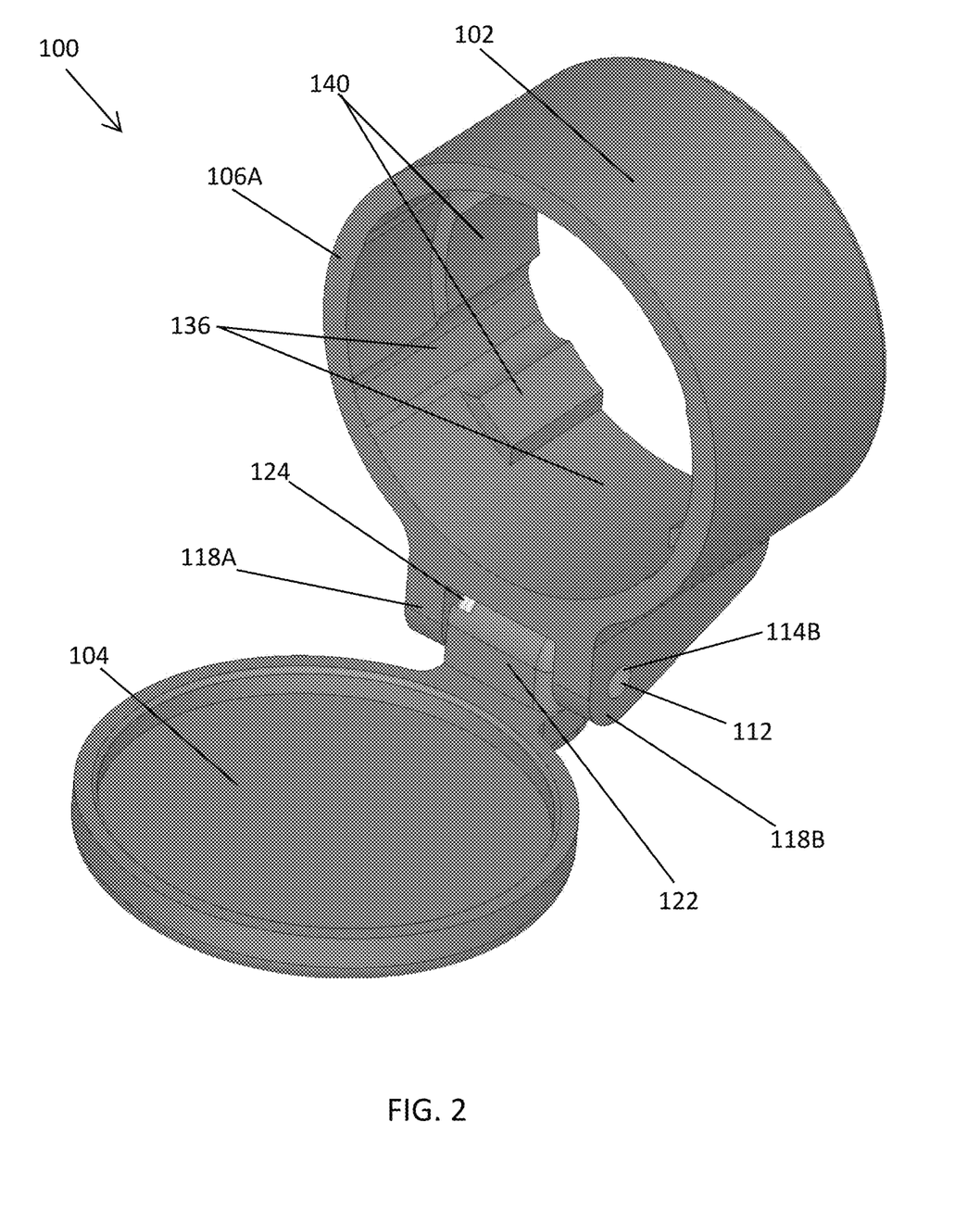
FIG. 2 shows a second perspective view of the female welding lead connector collar including a safety flip cover shown in FIG. 1.
Figure 3:
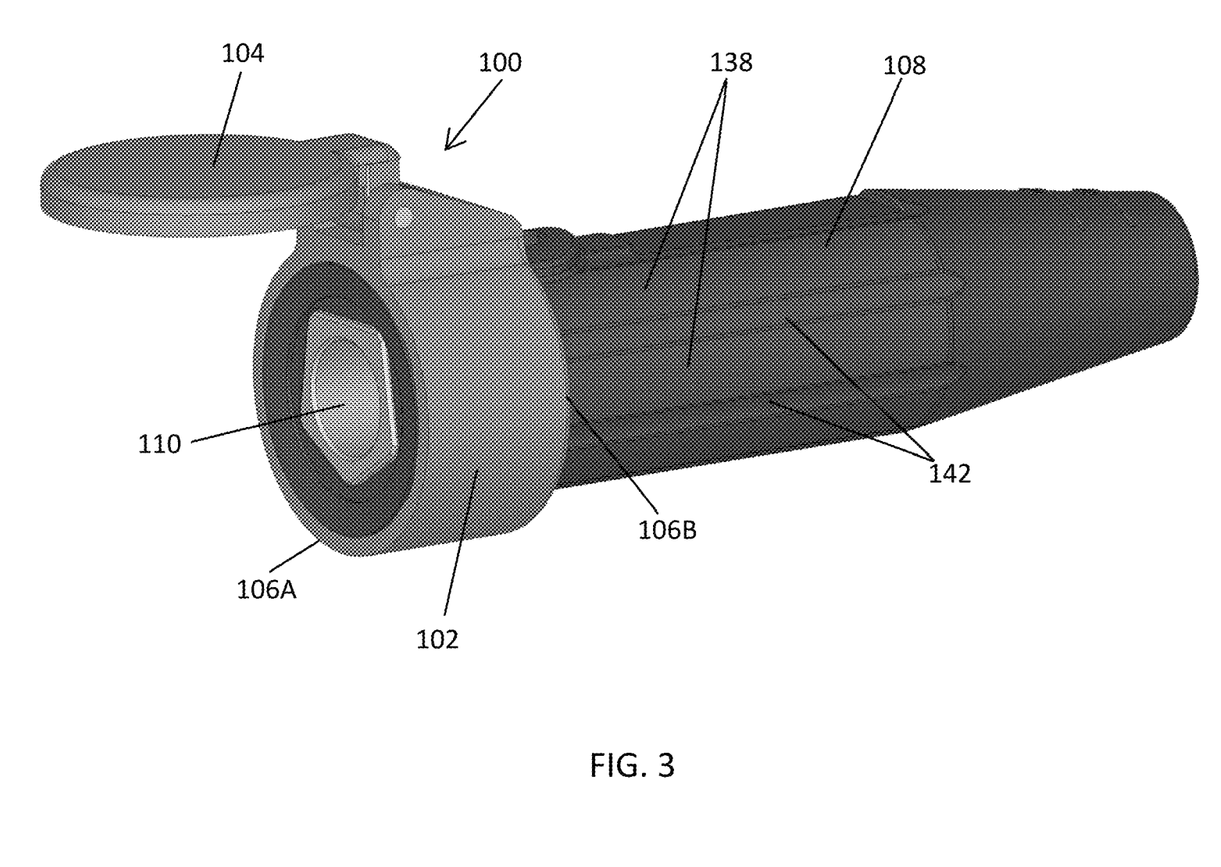
FIG. 3 shows a first perspective view of the female welding lead connector collar of FIG. 1 and FIG. 2 slid onto a female welding lead connector with the flip cover in an open position.
Figure 4:
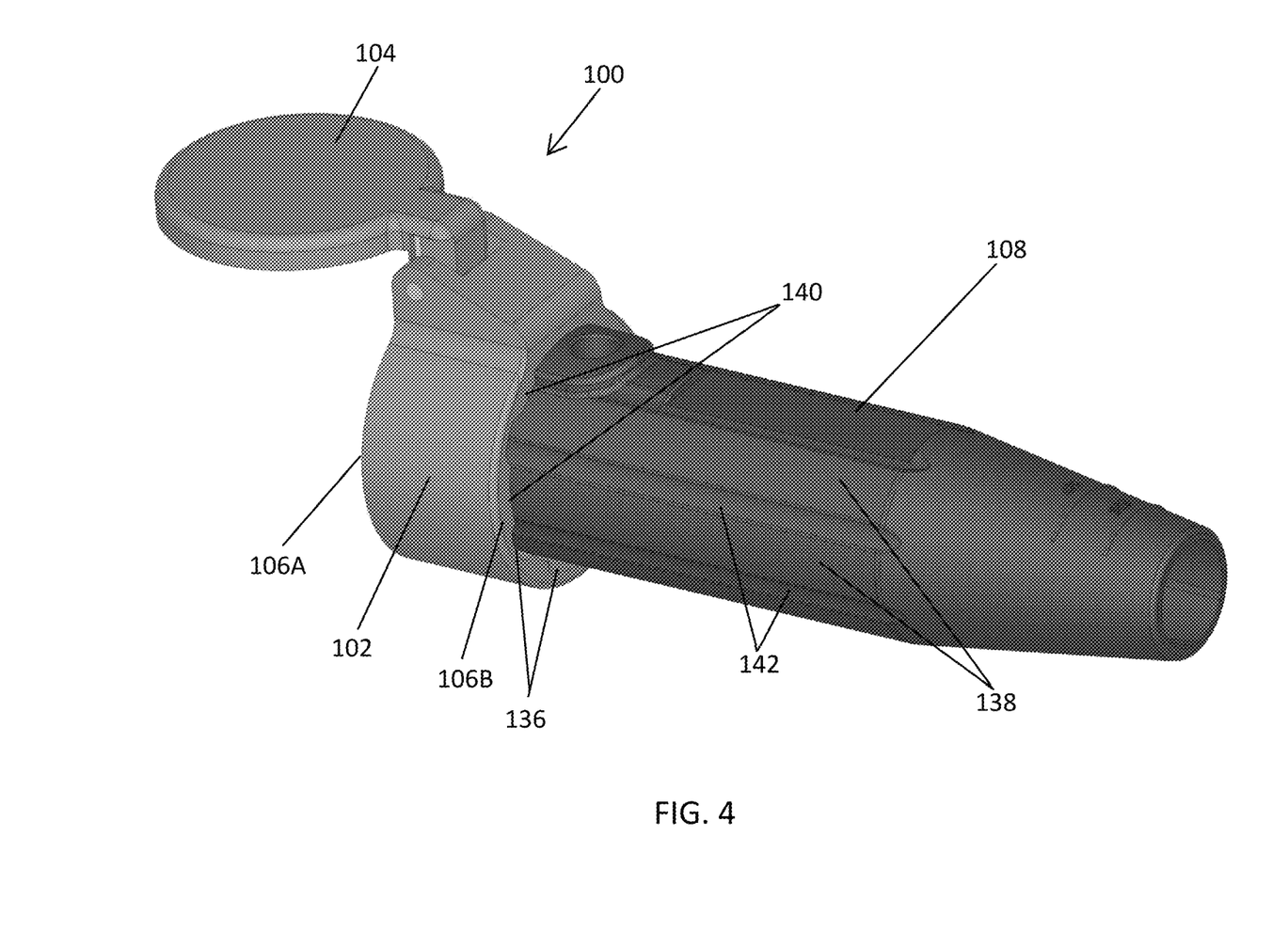
FIG. 4 shows a second perspective view of the female welding lead connector collar of FIG. 1 and FIG. 2 slid onto a female welding lead connector with the flip cover in the open position.
Figure 5:
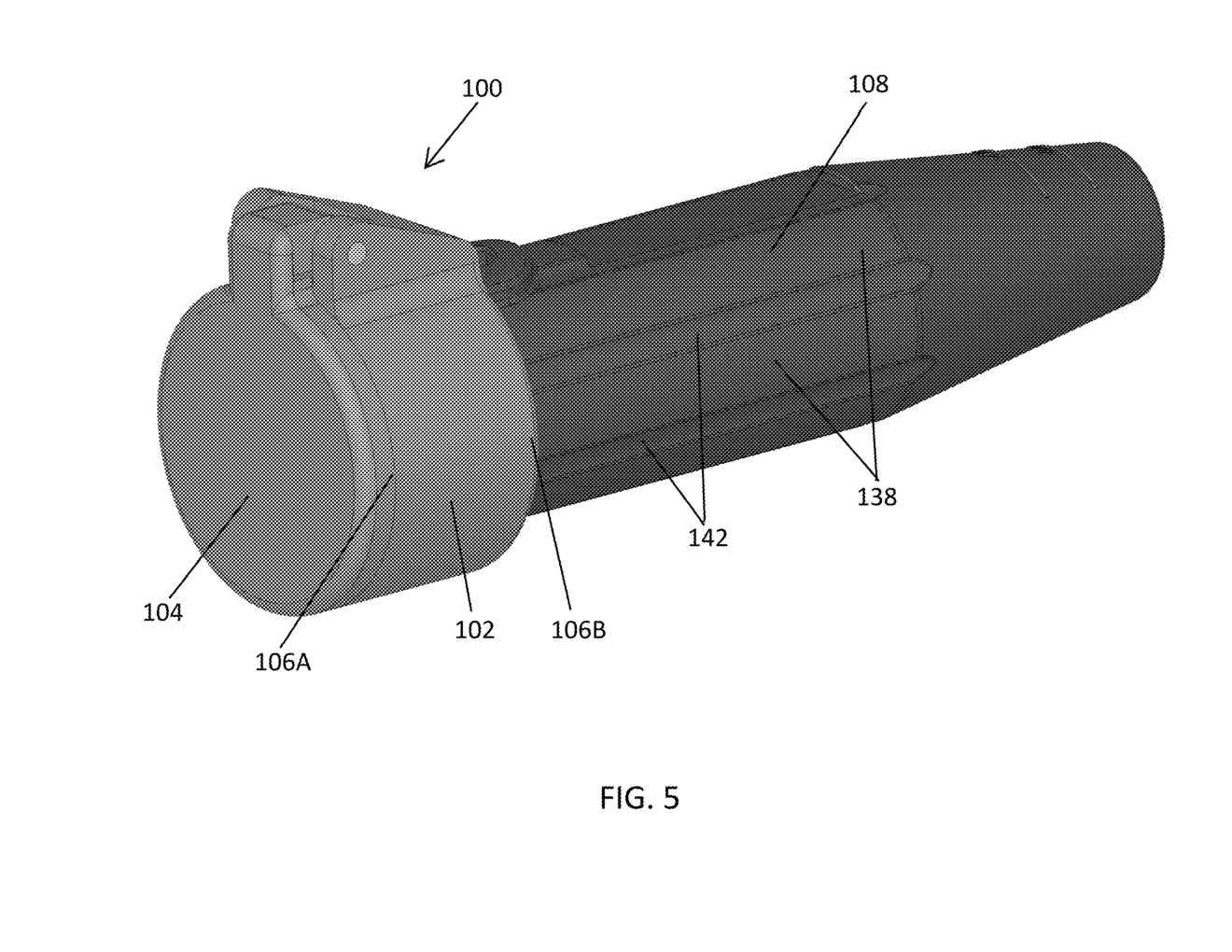
FIG. 5 shows a third perspective view of the female welding lead connector collar of FIG. 1 and FIG. 2 slid onto a female welding lead connector with the flip cover in a closed position.
Figure 6:
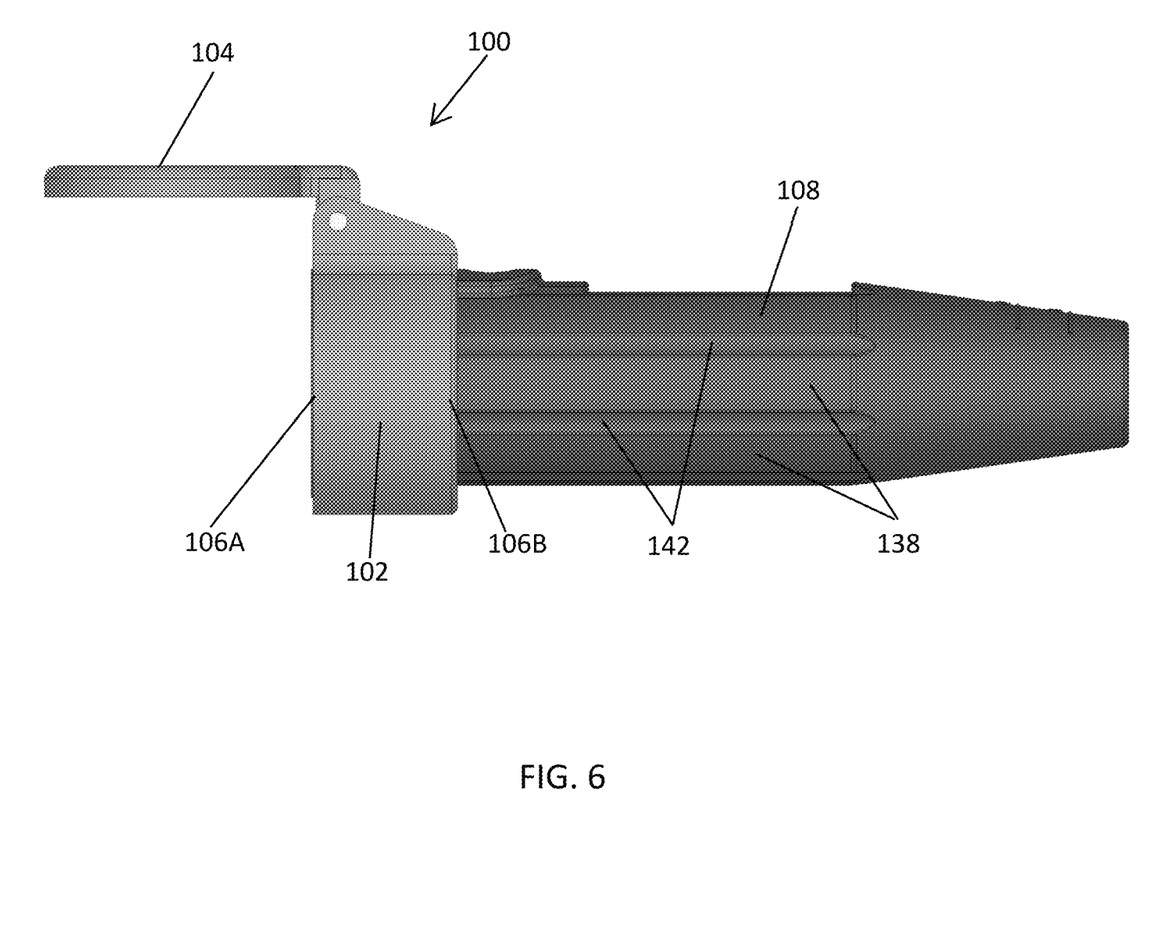
FIG. 6 shows a side view of the female welding lead connector collar of FIG. 1 and FIG. 2 slid onto a female welding lead connector with the flip cover in the open position.
Figure 7:
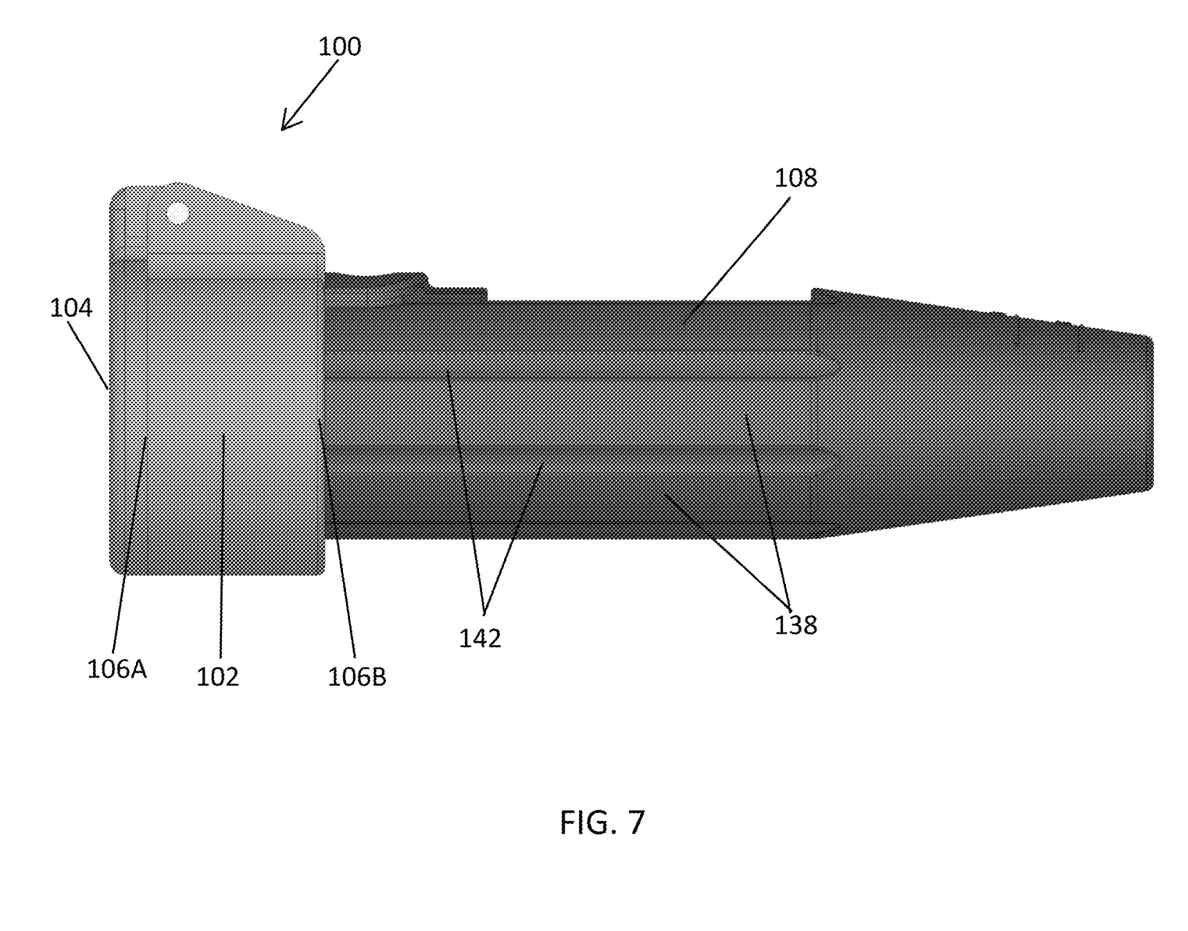
FIG. 7 shows a side view of the female welding lead connector collar of FIG. 1 and FIG. 2 slid onto a female welding lead connector with the flip cover in the closed position.
Figure 8:
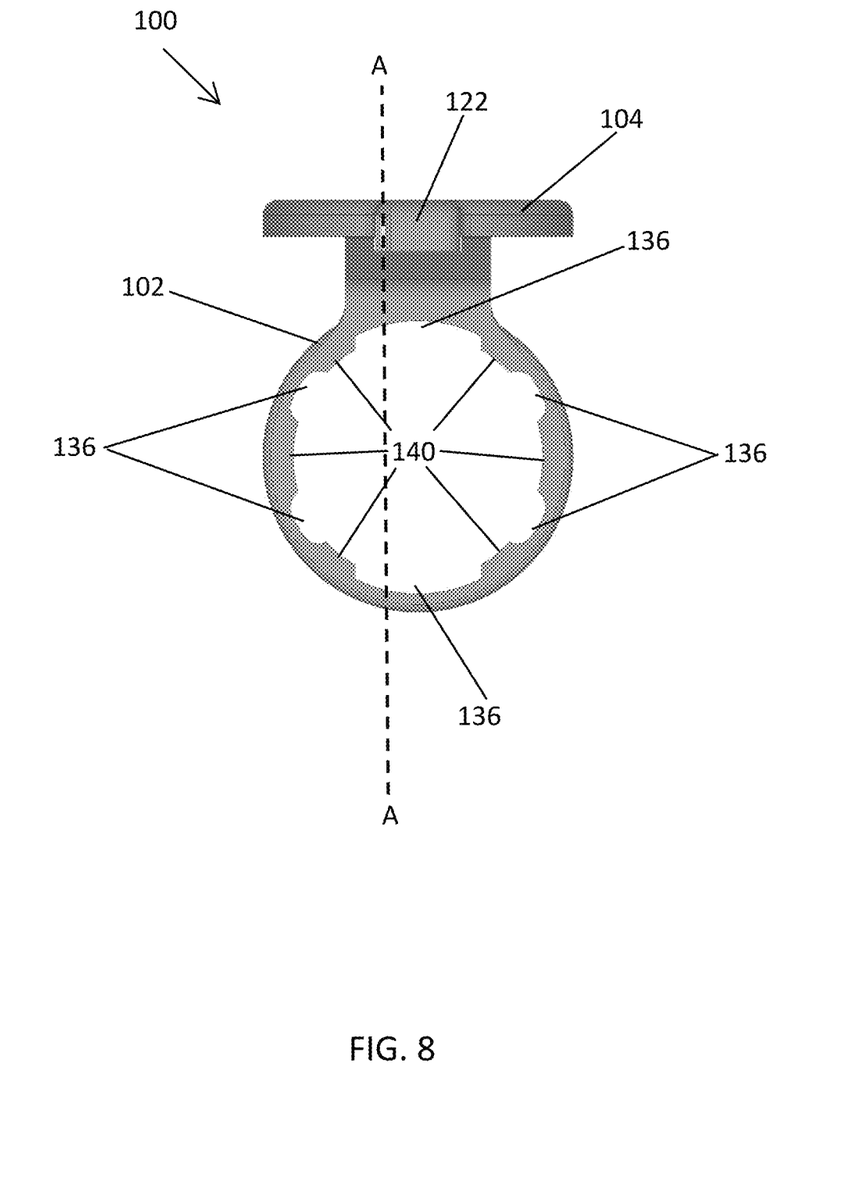
FIG. 8 shows an end view of the female welding lead connector from FIGS. 1-7 showing a plurality of collar main body grooves and collar main body bulges.
Figure 9:
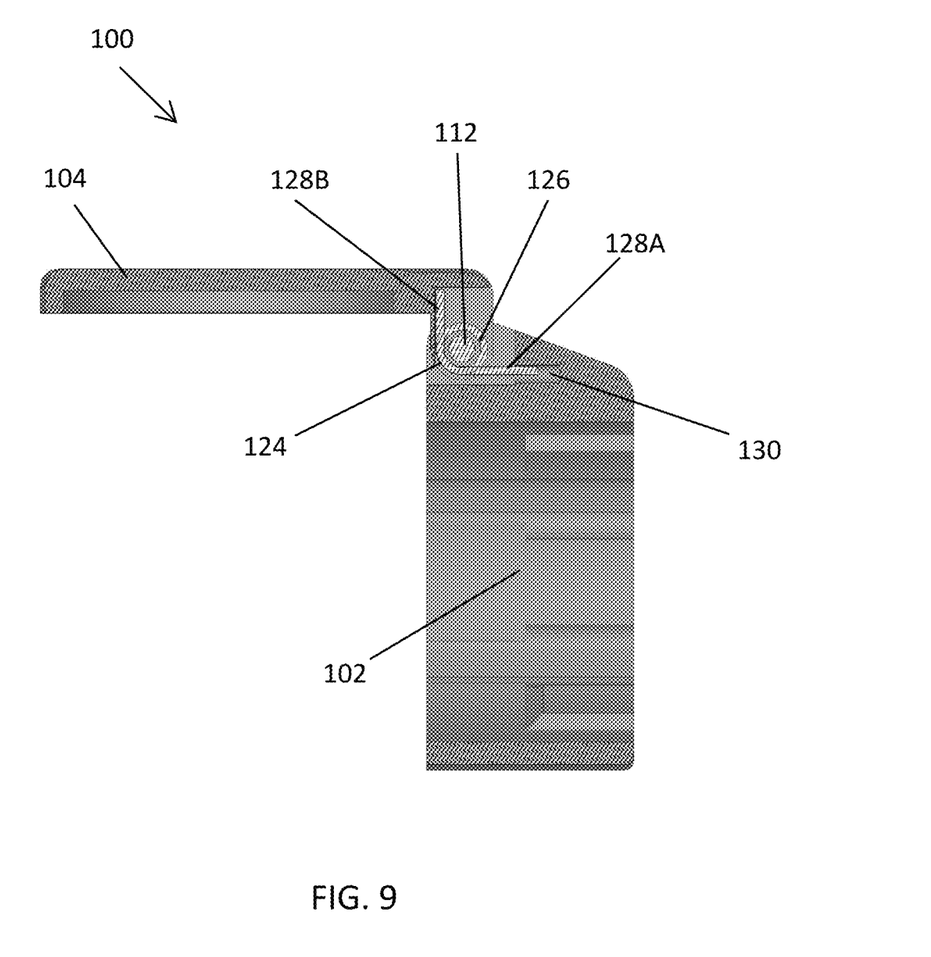
FIG. 9 shows a side view of the female welding lead connector collar from FIG. 8 cut along line A-A.

The hinge connection between the collar main body 102 and the cover 104 preferably includes a pin 112 which is inserted through a collar main body first aperture 114A, a cover aperture 116, and a collar main body second aperture 114B. The collar main body first aperture 114A is located in a collar main body first appendage 118A and the collar main body second aperture 114B is located in a collar main body second appendage 118B. The cover aperture 116 is located through a cover appendage 122 used to connect the cover 104 to the collar main body 102. The cover appendage 122 is located along a proximal edge 132A of the cover 104. A biasing apparatus 124 is preferably used to either bias the cover 104 in the open position or in the closed position. The biasing apparatus 124 is preferably a torsion spring including an open center 126 through which the pin 112 is inserted. A first leg 128A of the torsion spring is preferably inserted into a collar main body small cavity 130 as shown in FIG. 8, and a second leg 128B of the torsion spring is preferably inserted into or proximate to a proximal edge 132A of the cover 104.

The biasing apparatus 124 preferably includes a first leg 128A and a second leg 128B. FIG. 8 shows an exploded view which include the biasing apparatus 124 and the cover 104.

An internal surface 134 of the collar main body 102 preferably includes a plurality of collar main body grooves 136 to facilitate tight engagement with an outer surface of a female welding lead connector which often includes bulges such as the female welding lead connector bulges 138 shown in FIGS. 2-7. The collar main body 102 with the plurality of grooves 136 is configured to engage tightly with various models of female welding lead connectors such that it is a universal safety collar for female welding lead connectors. Additionally or alternatively, the internal surface 134 of the collar main body 102 preferably includes collar main body bulges 140 which facilitate tight engagement with an outer surface of a female welding lead connectors which often includes female welding lead connector grooves 142 like those shown in FIGS. 2-7. The collar main body grooves 136 and collar main body bulges 140 are seen more clearly in FIG. 8 which shows an end view of the female welding lead connector collar 100. When used, the collar 100 is preferably slid onto an outer surface of a female welding lead connector. When sliding onto a female welding lead connector, the female welding lead connector bulges 138 are preferably lined up with the plurality of collar main body grooves 136, and the collar main body bulges 140 are lined up with female welding lead connector grooves 142 so that the collar 100 fits tightly onto the female welding lead connector.

In addition to the collar 100 described above, a kit is disclosed which includes a plurality of collars identical or substantially the same as the collar 100 described above. The kit preferably includes at least three collars (and preferably more) wherein each collar is a different color. By using the kit of different-colored collars, persons using a large number of welding leads on a single project can easily visually distinguish between the different welding leads being used and, thereby, more quickly identify each individual welding lead and the apparatus(es) to which that particular welding lead is electrically tied.

The previously described embodiments of the present disclosure have many advantages. One advantage is the significant increase in safety created by shielding the female receptacle 110 of a female welding lead connector using the cover 104 to prevent contact with the female receptacle 110 from outside the cover 104 when the female welding lead connector on which the collar is engaged is not in use. Even if a contemporary female welding lead connector is not in use, it can still have a current of electricity flowing to it, creating an electrocution and electric arcing risk. The collar 100 including the cover 104 as described herein significantly reduces this risk because it blocks access to an internal core of a female welding lead connector on which the collar 100 is engaged. The biasing apparatus 124 is an advantage because it can either be configured to bias the cover 104 in the open position or bias the cover 104 in the closed position. The plurality of main body collar main body grooves 136 and the plurality of collar main body bulges 140 help the collar 100 fit tightly onto various models of female welding lead connectors and accommodate outer surface features of such female welding lead connectors, thereby making the collar 100 a universal collar 100 for female welding lead connectors. The grooves 136 and bulges 140 also prevent the collar 100 from rotating when in use along the outer surface of a welding lead connector on which the collar 100 is attached. Current models of female welding lead connectors can be retrofitted with the collar 100 to provide an extra layer of protection against electrocution and electric arcing.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

Any element in a claim that does not explicitly state "means for" performing a specified function, or "step for" performing a specific function, is not to be interpreted as a "means" or "step" clause as specified in 35 U.S.C. § 112, ¶ 6. In particular, the use of "step of" in the claims herein is not intended to invoke the provisions of 35 U.S.C. § 112, ¶ 6.

What is claimed is:

1. A safety collar for use with a female welding lead connector, the safety collar comprising:
   a. a collar main body configured to slide onto and fit tightly on an outside surface of a female welding lead connector, wherein a plurality of bulges having a longest length in an axial direction extend axially along an inside surface of the collar main body, wherein the bulges are configured to accommodate axially extending grooves on outside surfaces of multiple types of female welding lead connectors so that the safety collar will fit snugly and in place when attached to a female welding lead connector; and
   b. a cover hingedly connected to the collar main body wherein the cover is free to rotate either from a closed position to an open position, or from an open position to a closed position.

2. The safety collar of claim 1, wherein, when the collar is fully engaged onto a female welding lead connector, the cover is free to rotate either from a closed position in which the cover shields a female receptacle of the female welding lead connector to an open position in which a male welding lead connector can be received into the female receptacle, or from an open position in which a male welding lead connector can be received into the female receptacle to a closed position in which the cover shields the female receptacle.

3. The safety collar of claim 1 further comprising a biasing apparatus to either bias the cover to the open position or bias the cover to the closed position.

4. The safety collar of claim 3 wherein the biasing apparatus comprises a torsion spring.

5. The safety collar of claim 1 further comprising a plurality of grooves on an inside surface of the collar main body wherein the grooves are configured to accommodate bulges on outside surfaces of multiple types of female welding lead connectors so that the safety collar will fit snugly and in place when attached to a female welding lead connector.

6. A kit of a plurality of safety collars, the kit comprising:
   a first safety collar according to claim 1 of a first color;
   a second safety collar according to claim 1 of a second color; and
   a third safety collar according to claim 1 of a third color.

* * * * *